(12) United States Patent
Hamdi

(10) Patent No.: US 6,345,071 B1
(45) Date of Patent: Feb. 5, 2002

(54) FAST RETRAIN BASED ON COMMUNICATION PROFILES FOR A DIGITAL MODEM

(75) Inventor: Rabah S. Hamdi, Harris County, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/151,261

(22) Filed: Sep. 11, 1998

Related U.S. Application Data

(63) Continuation-in-part of application No. 09/122,561, filed on Jul. 24, 1998.

(51) Int. Cl.$^7$ ............... H04B 1/38; H04L 5/16

(52) U.S. Cl. ............ 375/222; 375/228; 370/252

(58) Field of Search ............... 375/222, 224, 375/225, 226, 227, 228; 370/252

(56) References Cited

U.S. PATENT DOCUMENTS

| | | | | |
|---|---|---|---|---|
| 4,756,007 A | * | 7/1988 | Qureshi et al. | 375/259 |
| 4,780,883 A | * | 10/1988 | O'Connor et al. | 375/219 |
| 4,785,448 A | | 11/1988 | Reichert et al. | |
| 5,007,047 A | * | 4/1991 | Sridhar et al. | 370/286 |
| 5,799,064 A | * | 8/1998 | Sridhar et al. | 379/93.06 |
| 5,802,153 A | * | 9/1998 | Sridhar et al. | 375/220 |
| 5,903,602 A | * | 5/1999 | Torkkel | 375/222 |
| 5,982,768 A | * | 11/1999 | Bellenger et al. | 70/352 |
| 6,101,216 A | * | 8/2000 | Henderson et al. | 375/222 |

OTHER PUBLICATIONS

XL 12000 High Speed Network Modem, Tut Systems, Inc.; 2495 Estand Way, Pleasant Hill, CA 94523; Doc. No. DS12KV2; Jul. 1997.

XL18000 Long Distance Network Modem; Tut Systems, Inc.; 2495 Estand Way, Pleasant Hill, CA 94523; Doc. No. DS182KV2; Jul. 1997.

XL15000 10 Mbps Network Extension; Tut Systems, Inc.; 2495 Estand Way, Pleasant Hill, CA 94523; Doc. No. DS1500V2; Jul. 1997.

XL600 10 Mbps Network Extension; Tut Systems, Inc.; 2495 Estand Way, Pleasant Hill, CA 94523; Doc. No. DSXL600V2; Jul. 1997.

MB Series Ethernet Repeaters; Tut Systems, Inc.; 2495 Estand Way, Pleasant Hill, CA 94523; Doc. No. DSMBSV2; Jul. 1997.

(List continued on next page.)

*Primary Examiner*—Stephen Chin
*Assistant Examiner*—Lenny Jiang
(74) *Attorney, Agent, or Firm*—Akin, Gump, Strauss, Hauer & Feld, LLP

(57) ABSTRACT

A digital modem for operating in a splitterless environment that supports fast retrain based on communication profiles. The modem includes a memory that stores a plurality of communication profiles, ADSL communication logic that sends and receives information via a phone line and that operates according to any one of the plurality of communication profiles, and signal quality monitor logic that continuously monitors communication on the phone line. The monitor logic provides a signal change indication if the signal quality changes by at least a predetermined amount. The modem further includes fast retrain logic that selects another one of the profiles stored in the memory in response to the signal change indication, that retrains the communication logic to operate according to the selected profile and that cooperates with the communication logic to transmit a fast retrain indication via the phone line to the central office ADSL modem. The digital modem may also include training or measurement logic that determines the communication characteristics of the phone line, that generates a corresponding profile and that sends the new profile to the other modem via the phone lines.

12 Claims, 9 Drawing Sheets

OTHER PUBLICATIONS

Johnson, Mary; "Tut's Uncommon Net Link"; LAN Times, vol. 12, Issue 26; Copyright by McGraw–Hill, Inc.; Dec. 18, 1995 ( to order call 612/582–3800).

Tut Systems' Products Internet Access: http://www.tutsys.com/html/products.html; 2495 Estand Way, Pleasant Hill, CA 94523; Jul. 1997.

McBinity, Meg; "Wired for Data—HomeRun squeezes more out of in–house wiring"; *tele.com*, Aug. 1997 http;//www-.tutsys.com/html/wirefordata.html; Tut Systems; 2495 Estand Way, Pleasant Hill, CA 94523; Jul. 1997.

HR1300T; Tut Systems' HomeRun™; 2495 Estand Way, Pleasant Hill, CA 94523; Doc. No. DSHRHECV1; May 1997.

* cited by examiner

FAST RETRAIN BASED ON COMMUNICATION PROFILES FOR A DIGITAL MODEM

CROSS-REFERENCE TO RELATED APPLICATIONS

The present application is a continuation-in-part of U.S. application Ser. No. 09/122,561 entitled "Virtual Gateway that Couples Different Networks Over a Common Transmission Medium", filed Jul. 24, 1998, which is hereby incorporated by reference herein in its entirety.

FIELD OF THE INVENTION

The present invention relates to digital modem that supports fast retrain based on communication profiles.

DESCRIPTION OF THE RELATED ART

Many personal computer systems (PC's) are sold with, or have the ability to add, a communication device such as a digital or analog modem or the like that enables communication with an external network via telephone wires from the home. The most common external network is the Internet, although other networks including broadband networks, public networks and wide area network (WANs) are contemplated. For simplicity, all such external or broadband networks are referred to herein as WANs. Dial-up modem technology is relatively easy to install and comfortable for the end user to use and currently operates up to a common data rate of approximately 56K bits per second (bps). The 56K bps dial-up modem solution provides a significant increase in speed as compared to a 14.4K bps modem, but does not provide a significant speed advantage as compared to a 28.8K bps modem. The actual modem speed achieved is directly proportional to the quality of the channel characteristics of the voice band signal in a given home location. At the present time, none of the Internet Service Providers (ISP) are guaranteeing the actual rate for the end user.

One significant problem with analog modems are that they interfere with or otherwise cannot be used simultaneously with standard telephones operating according to the Plain Old Telephone Service (POTS) or Message Telecommunications Services (MTS) and other voice band services. The home user is forced to install an entirely separate telephone line in order to have simultaneous access to a WAN while maintaining standard telephone service. An entirely separate and independent phone line is relatively costly and inconvenient.

In spite of advances in dial-up technology, the explosive popularity of the Internet has caused consumers to become frustrated by the relatively slow speed of their connection using analog modems. The Integrated Services Digital Network (ISDN) service has been used at some home sites and small businesses and offers somewhat higher speed access. However, access charges for ISDN are still high for the average consumer and it is not available everywhere. Also, each customer's loop must first be qualified in order to be connected. Digital Subscriber Loop (DSL) technology, particularly the asymmetrical DSL (ADSL), is beginning to emerge as the technology of choice to provide broadband access to consumers. A digital class of modems supporting ADSL provides significantly higher speed than either analog modems or ISDN devices. Furthermore, ADSL does not require a different type of transmission media such as an ISDN line or the like. Traditionally, however, ADSL required a second phone wire to be installed within the home that required a truck roll and possibly a POTS splitter to be installed at the demarcation point at the home.

The LAN and broadband access issues are also applicable to the small office environment. Small offices commonly include an entirely separate telephone network, a separate LAN network and a separate WAN or broadband connection through a separate physical medium connection such as an ISDN line or the like.

One issue with using ADSL and POTS on the same transmission media is that each phone handset changes the line quality and communication characteristics of the transmission media, such as the characteristic impedance, when on or off hook. Such change in the communication characteristics of the transmission media effects ADSL operation, such as the signal quality, divergence of equalizers, echo cancelers, carrier and timing recovery and other digital signal processing (DSP) algorithms, etc.

It is desired to use existing phone lines and to further provide broadband access without the requirement of a local POTS splitter or separate phone lines. It is further desired to use standard telephone services on the same transmission medium such as a standard phone line without interfering with ADSL communications.

SUMMARY OF THE INVENTION

A digital modem that supports fast retrain based on communication profiles according to the present invention includes a memory that stores a plurality of communication profiles. The modem also includes communication logic that sends and receives information via a transmission medium and that operates according to any one of the plurality of communication profiles, and monitor logic that continuously monitors communication by the communication logic on the transmission medium according to any one of the plurality of communication profiles and that provides a signal change indication if the communication characteristics change by at least a predetermined amount. The modem further includes fast retrain logic that selects another one of the communication profiles stored in the memory in response to the signal change indication, that retrains the communication logic to operate according to the selected communication profile and that cooperates with the communication logic to transmit a fast retrain indication via the transmission medium.

In the embodiments illustrated, the digital modem is an ADSL modem that operates according to the Discrete MultiTone (DMT) modulation method using a plurality of upstream and downstream tones, where each tone is within one of a plurality of sub-channels or sub-frequencies of the transmission medium bandwidth. The ADSL modem may operate at a home location without requiring a POTS splitter. The ADSL modem, otherwise referred to as the Remote ADSL Termination Unit (ATU-R), communicates with a Central Office ADSL Termination Unit (ATU-C) located at the central office of the telephone company. Because a POTS splitter is not present, the digital modem operates on the same phone lines or transmission medium as one or more standard telephones operating according to POTS. In this manner, POTS signaling and on/off hook transitions of the telephones change the communication characteristics of the phone lines and affect ADSL communications. The signal quality is compromised so that the same data rate may not be maintained. However, communication may be continued at a lower data rate according to a different profile. The digital modem includes the fast retrain logic to automatically switch between communication profiles to resume communications very quickly.

The digital modem may include measuring logic that cooperates with the communication logic to measure the communication characteristics of the transmission medium and that generates and stores a corresponding communication profile in the memory. In at least one embodiment, each of the communication profiles are measured and stored in this manner. Upon initialization of the modem, the measuring logic is employed to measure the initial signal line quality, which typically reflects the optimal conditions of the phone lines while all of the telephones are on-hook. During operation, the monitoring logic detects a disturbance of the communications, such as when any one or more of the phones transition to off-hook. If the communication profile is no longer valid where the communication logic is unable to sustain communications, and if the fast retrain logic determines that none of the profiles stored in the memory are valid for the given status of the transmission medium, then the measuring logic is again invoked to measure the communication characteristics and generate a new communication profile. The new profile is stored in the memory and sent to the other modem via the transmission medium. Both modems retrain according to the new communication profile. Operation continues in this manner for any number or up to a maximum number of profiles.

The monitoring logic also detects when a disturbance is removed and the communication characteristics improve. If so, the monitoring logic indicates to the fast retrain logic, which finds a better communication profile and quickly retrains the communication logic according to the better communication profile. Also, once all of the likely disturbances are detected and measured and corresponding profiles are generated and stored, the fast retrain logic is able to quickly find the appropriate profile and retrain the modem accordingly with little or no interruption in communications.

In one embodiment, the digital modem measures the transmission medium and stores only two different profiles including an initial best-case profile and a worst-case profile. If a new disturbance causes a greater depreciation of line quality than the current worst-case profile, then a new worst-case profile is generated which replaces the current worst-case profile. The use of only two profiles simplifies the fast retrain indication. Upon receiving the fast retrain indication, both modems simply switch to the other stored profile. In the two profile basic embodiment, the fast retrain indication may comprises a single tone generated on any one of the sub-channels. In the more complex embodiment in which a plurality of profiles are generated and stored, the fast retrain indication may comprise a plurality of tones that identify any one of the profiles. For example, the plurality of tones may implement a binary index to the plurality of communication profiles. In this manner, the remote modem is able to quickly determine the appropriate profile and retrain accordingly.

A modem system according to the present invention includes a transmission medium, a first digital modem implemented in a similar manner described above, and a second digital modem that also includes communication logic, fast retrain logic and memory for storing profiles. The second modem either receives the fast retrain indication and retrains its communication logic to operate according to the indicated communication profile stored locally, or receives and stores a new communication profile and retrains its communication logic to operate according to the new communication profile. In an alternative embodiment, the modems exchange the initial profile and independently calculate and store one or more other profiles based on the initial profile and one or more predetermined cutback value. The predetermined cutback values, for example, may comprise a certain signal-to-noise (SNR) reduction of one or more of the sub-channels.

A method of fast retraining first and second digital modems communicating across a transmission medium according to the present invention includes the first modem measuring the communication characteristics under two different signal conditions of the transmission medium, generating corresponding first and second communication profiles and sending the first and second communication profiles to the second modem via the transmission medium. The method further includes the first and second modems operating and communicating via the transmission medium according to either one of the first and second communication profiles. When the first modem detects a change of the communication characteristics of the transmission medium, it sends a fast retrain indication to the second modem, and the first and second modems switch and operate according to the other communication profile.

The method may further include the first modem, after detecting a change of the communication characteristics of the transmission medium, measuring the communication characteristics of the transmission medium and generating a third communication profile.

The first modem then sends the third communication profile to the second modem via the transmission medium. The method may further include the first and second modems operating and communicating via the transmission medium according to any one of the first, second and third communication profiles. When the first modem detects a change of the communication characteristics of the transmission medium, it selects another profile and sends a fast retrain indication to the second modem identifying the selected communication profile. The first and second modems then switch and operate according to the selected communication profile. The method may further include the first modem measuring the communication characteristics under a plurality of different signal conditions of the transmission medium and generating a corresponding plurality of communication profiles. The first modem then sends the plurality of communication profiles to the second modem via the transmission medium. The first and second modems operate and communicate via the transmission medium according to any one of the plurality of communication profiles. If the first modem detects a change of the communication characteristics of the transmission medium, it selects a communication profile other than the current communication profile and sends a fast retrain indication to the second modem that identifies the selected communication profile. Then, the first and second modems switch and operate according to the selected communication profile. The fast retrain indication may comprise a plurality of tones to form an index to the plurality of profiles.

It is now appreciated that a digital modem and modem system according to the present invention enables efficient ADSL communications for a home location without a POTS splitter. Disturbances in the line or signal quality are detected and measured and a new profile is generated and exchanged between the modems. Both modems adapt to the new communication characteristics by retraining according to the new communication profile. At least two profiles, including a best-case profile and a worst-case profile, enable communications to continue with little or no interruption. When operating according to one of two profiles, if one of the modems detects a disturbance or removal of a disturbance, it sends a fast retrain indication and both modems switch to operate according to the other profile. A plurality of profiles may also be generated and used, where one modem determines the proper profile and asserts the fast retrain indication to identify the appropriate profile. In this manner, both modems quickly retrain according to the same profile and resume communications.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
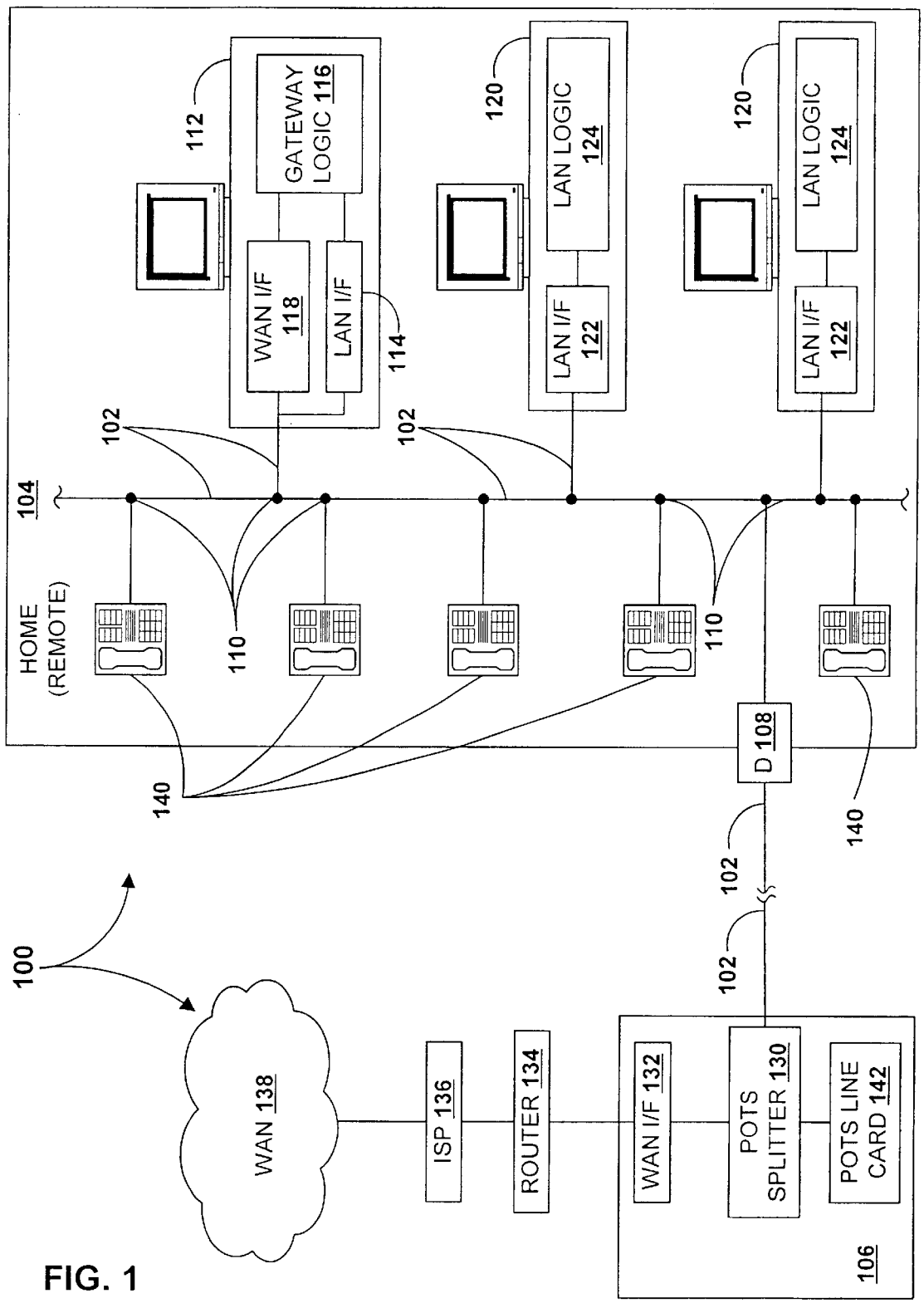
FIG. 1 is a block diagram of a network system including a virtual gateway system.

Referring now to FIG. 1, a network system 100 is shown including a virtual gateway system. A home location 104 is wired with a transmission medium 102, such as standard four wire twisted-pair telephone lines commonly used in homes throughout the United States. In the embodiment shown, the transmission medium 102 comprises telephone wires routed from a central office 106 of the telephone company (Telco) to the home site 104 establishing an unbroken metallic path. Other transmission media are contemplated, such as coaxial cables, various types of twisted-pair wire configurations, fiber optic cables, etc. and may also include one or more wireless connections as desired.

The transmission medium 102 enters the home location 104 via a standard network interface device demarcation (D) 108 and then is routed throughout the home location 104 in any manner as desired. A plurality of phone line connectors 110 are provided, each for enabling extension of the transmission medium 102 for connection to a network device via a compatible connector. For example, the transmission medium 102 may be routed to standard RJ-11 telephone plugs installed throughout the home location 104 to connect computers and telephones using corresponding RJ-11 plugs. Each connector 110 refers to the plug, the jack or both.

A gateway access node 112 is coupled to the transmission medium 102 via a single connector 110. The transmission medium 102 is coupled to a local area network interface (LAN I/F) 114 within the gateway access node 112, where the LAN I/F 114 further interfaces to gateway logic 116. Likewise, a wide area network interface (WAN I/F) 118 within the gateway access node 112 is coupled to the transmission medium 102 via the same connector 110, where the WAN I/F 118 further interfaces to the gateway logic 116. The LAN and WAN I/Fs 114, 118 each primarily include the appropriate hardware and hardware interfaces, such as PHY devices or the like and expansion or peripheral buses etc., for establishing a communication link between the transmission medium 102 and the processor of the gateway access node 112. The gateway logic 116 includes appropriate software components, such as one or more LAN and WAN device drivers, and gateway software for establishing a communication link between the LAN and WAN drivers. The gateway logic 116 also comprises appropriate hardware portions, such as the memory and processing devices for executing the software portions.

One or more computer systems or PCs, each implementing a local network node 120, are also coupled to the transmission 102 via corresponding connectors 110 in a similar manner as described for gateway access node 112. Each node 120 includes a LAN I/F 122 that couples to the transmission medium 102, where the LAN I/F 122 further interfaces to LAN logic 124 within each node 120. Each LAN I/F 122 includes the appropriate hardware components for establishing LAN communications via the transmission medium 102 as known to those skilled in the art of network communications. The LAN logic 124 includes the appropriate software, such as LAN software and drivers, and the appropriate hardware, such as memory and processing circuitry.

It is appreciated that the home location 104 may be "wired" using the transmission medium 102 in any desired manner for coupling as many computers or nodes 120 to the gateway access node 112 via the transmission medium 102 depending upon the particular LAN configuration limitations. Various LAN configurations are contemplated, such as variations of the standard 10BaseT or Fast 100BaseT Ethernet® solutions, FDDI, CDDI, ATM, etc. In this manner, a user at the home location 104 may establish a LAN system including as many computer systems as desired for sharing files and various resources throughout the home location 104.

The central office 106 is remotely located relative to the home location 104 but coupled to the same transmission medium 102. The central office 106 includes a POTS splitter 130 coupled to the transmission medium 102 and a WAN I/F 132 coupled to the POTS splitter 130. In this manner, the WAN interface 118 of the home location 104 establishes a WAN communication link with the WAN interface 132 at the central office 106 via the transmission medium 102 on both sides of the demarcation 108. The WAN interface 132 at the central office 106 may further be coupled to an appropriate router 134 and an Internet Service Provider (ISP) 136 to establish communications with the WAN 138, which comprises any external network system, such as, for example, the Internet. In this manner, the user at the home location 104 has access to the WAN 138 via the gateway access node 112, the transmission medium 102 and the WAN interface 132 of the central office 106.

It is further noted that the gateway logic 116 is implemented to enable communications between the LAN I/F 114 and the WAN I/F 118. In this manner, the LAN system established at the home location 104 including the nodes 120 and the gateway access node 112 has access to the WAN 138 via the gateway access node 112 and the transmission medium 102. It is further noted that the LAN and WAN communications are simultaneously operated on the same transmission medium 102 without having to install a POTS splitter at the home location 104.

A plurality of standard telephones 140 are also coupled to the transmission medium 102 at the home location 104 via corresponding connectors 110. A POTS line card 142, such as a Subscriber Line Interface Circuit (SLIC) device or the like, is coupled to the POTS splitter 130 at the central office 106 for establishing communications with the telephones 140 at the home location 104. The POTS line card 142 of the central office 106 enables the user at the home location 104 to establish telephonic communications using any one or more of the telephones 140. It is further noted that the user may simultaneously use any telephone 140 to make a phone call without interruption of the LAN system at the home location 104 and without interruption of the WAN communication link between the home location 104 and the central office 106. In this manner, at least two separate network systems are operated simultaneously with standard telephone services on the same transmission medium 102.

The gateway logic 116 transfers communication from the LAN to the WAN link and vice versa. For packet-based communications, such as Ethernet® or the like, the gateway logic 116, via the LAN I/F 114, retrieves packets from the transmission medium 102 on the LAN intended for the WAN 138. The packets are converted and then transmitted onto the transmission medium 102 via the WAN I/F 118 to the POTS splitter 130 of the central office 106. Response packets or any packets from the WAN 138 intended for the LAN system of the home location 104 are routed to the WAN I/F 132 and the transmission medium 102. The WAN packets are retrieved from the transmission medium 102 by the gateway logic 116 and the WAN I/F 118. If intended for any of the node 120 of the LAN system, the gateway logic 116 converts and transmits the packets onto the transmission medium 102 via the LAN I/F 114 according to normal LAN protocol.

Figure 2:
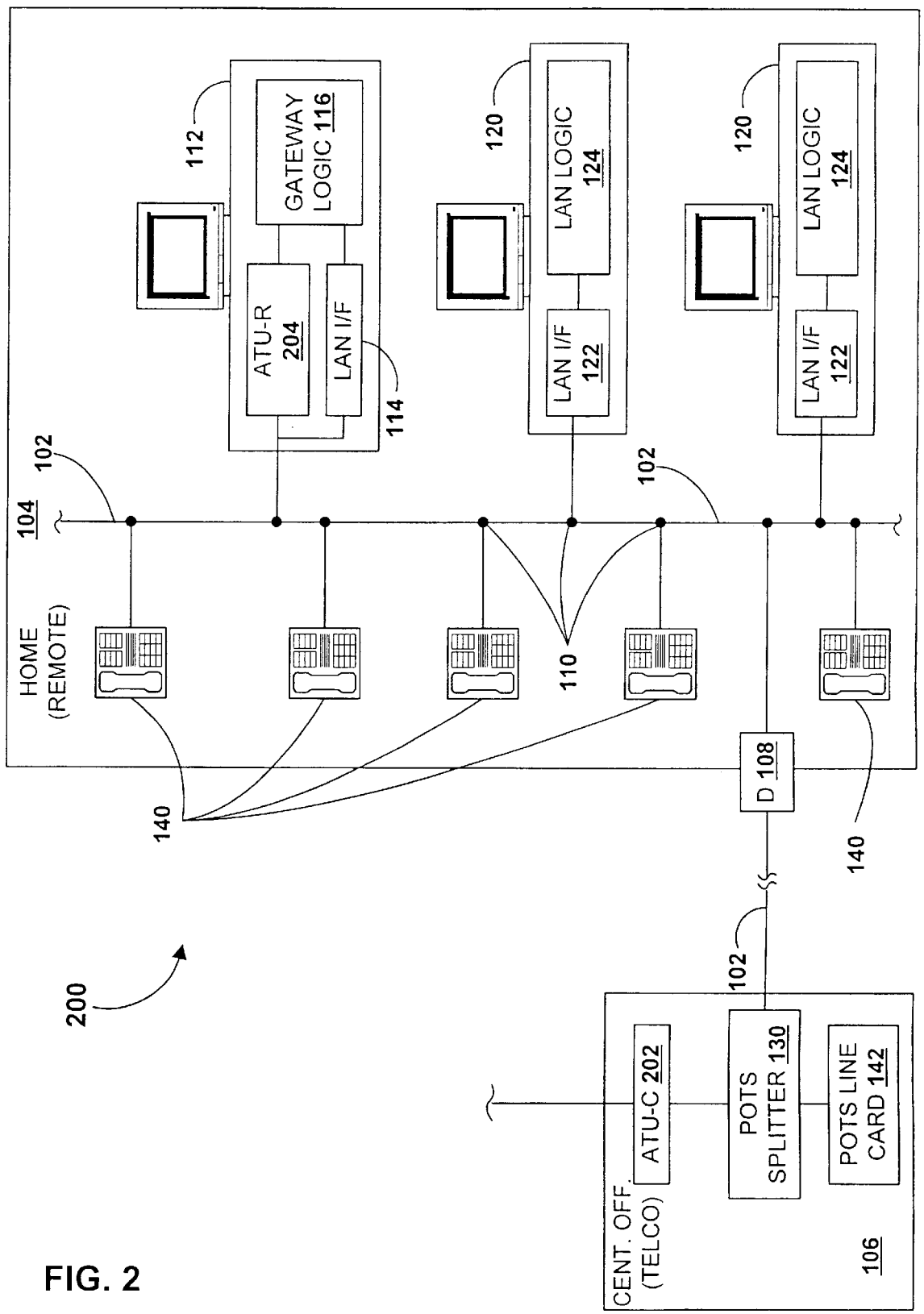
FIG. 2 is a block diagram of a network system similar to the network system of FIG. 1 except specifically using ADSL technology for the WAN connection.

FIG. 2 is a block diagram of another network system 200, which is similar to the network system 100 except that the WAN communication link is established using ADSL technology. In particular, the WAN interface 118 of the gateway access node 112 is replaced with a Remote ADSL Termination Unit (ATU-R) 204 and the WAN interface 132 at the central office 106 is replaced with a Central office ADSL Termination Unit (ATU-C) 202. It is noted that various other DSL technologies (xDSL) are also contemplated to establish the WAN communication link. Operation is similar to the network system 100 where WAN communications are according to ADSL.

Figure 3:
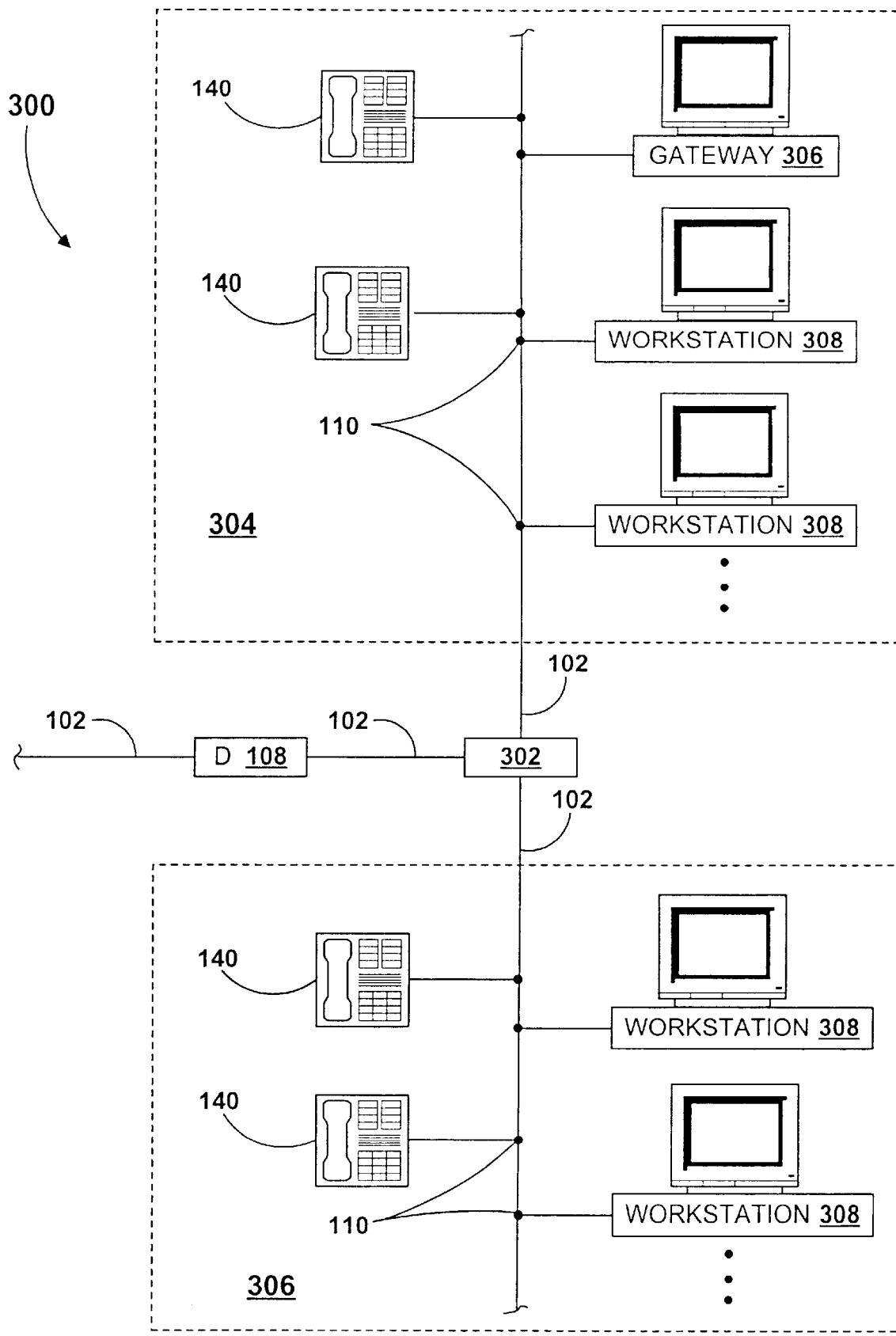
FIG. 3 is a block diagram of another network system similar to the network system of FIG. 1 except that the home location is replaced with two or more office locations for a small office environment.

FIG. 3 is a block diagram of yet another network system 300, which is similar to the network system 100 except that the home location 104 is replaced with two or more office locations 304 and 306 to represent a small office environment. The transmission medium 102 is provided through a standard demarcation 108 and is further split into two LAN segments for the office locations 304 and 306, respectively. A junction 302 either comprises a direct physical connection between the LAN segments of the locations 304 and 306 or alternatively includes a repeater or switch for linking two or more LAN segments of the transmission medium 102.

The first LAN segment of the office location 304 includes a gateway access node 306, which is implemented in a similar manner as the gateway access node 112 and which is coupled to the transmission medium 102 in a similar manner via a connector 110. The office location 304 further includes one more workstation nodes 308, each implemented in a similar manner as the nodes 120 previously described and coupled using corresponding connectors 110. The office location 304 may further include one more telephones 140 coupled to the transmission medium 102 using corresponding connectors 110. The office location 306 is configured in a similar manner and includes one or more workstation nodes 308 and one or more telephones 140 coupled to the transmission medium 102 using corresponding connectors 110. However, the office location 306 need not include another gateway access node 306.

The workstation nodes 308 of the office location 304 establish a first LAN segment and the workstation nodes 308 within the office location 306 establish a second LAN segment, where each LAN segment and the corresponding workstation nodes 308 all effectively operate on the same transmission medium 102 or extensions thereof. Furthermore, both LAN segments have access to WAN communications via the gateway access node 306 over the same transmission medium 102. In a similar manner as described previously, the gateway access node 306 establishes a communication link with a WAN interface in a central office of a telephone company, such as the central office 106 described in FIG. 1. In this manner, a LAN may be further divided into several LAN segments where each segment has access to WAN communications via a common gateway access node 306 and transmission medium 102.

Figure 4:
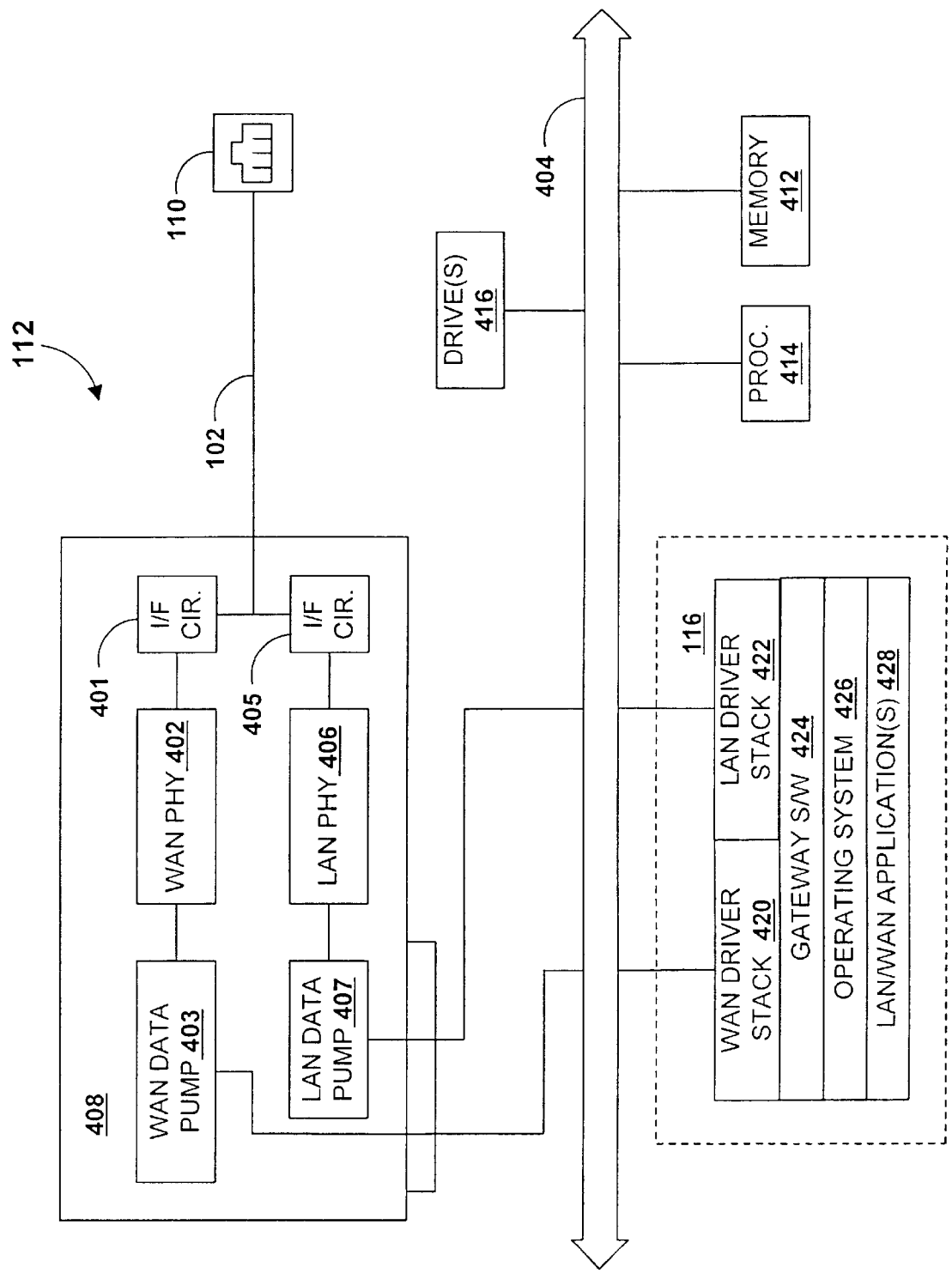
FIG. 4 is a more detailed block diagram of one implementation of the gateway access node of FIG. 1.

Referring now to FIG. 4, a block diagram is shown of one embodiment of the gateway access node 112. A connector plug 110 is shown for extending the transmission medium 102, which is further coupled to an interface circuit 401 for WAN communications and another interface circuit 405 for LAN communications. The interface circuit 401 is coupled to a WAN PHY device 402 and the interface circuit 405 is coupled to a LAN PHY 406. The WAN PHY 402 is further coupled to a WAN data pump 403, which includes any processing logic and buffer memory necessary for transferring data between the WAN PHY 402 and a hardware interface 404 of the gateway access node 112. The LAN PHY 406 is coupled to a LAN data pump 407, which includes any processing logic and buffer memory necessary for transferring data between the LAN PHY 406 and the hardware interface 404. The interface circuit 401, the WAN PHY 402 and the WAN data pump 403 implements a WAN port for WAN communications, and the interface circuit 405, the LAN PHY 406 and the LAN data pump 407 implements a LAN port for LAN communications. The LAN and WAN ports may be implemented on an expansion card 408 configured to plug into an appropriate socket or slot of the hardware interface 404. The expansion card 408 and the hardware interface 404 collectively serve as the primary hardware portion of a virtual gateway system.

The hardware interface 404 generally represents one or more buses and/or ports and interfaces for enabling one or more external communication links. For example, the hardware interface 404 may include one or more expansion or peripheral or other (I/O) buses, a video bus, a memory bus, an, etc. as is commonly found in computer systems. Also shown coupled to the hardware interface 404 is system memory 412, which may further include volatile memory such as random access memory (RAM) or the like and possibly non-volatile memory such as read only memory (ROM) or the like. A central processing unit (CPU) or processor 414 is shown coupled to the hardware interface 404 for accessing and executing software, programs, device drivers, etc. loaded into the system memory 412. One or more storage devices or drives 416 may be provided and coupled to the hardware interface 404, where the drive(s) may include one or more floppy disk drives, hard disk drives, CD ROM drives, tape drives, etc. The hardware interface 404 is also shown interfaced to the gateway logic 116, which represents the software portion of a virtual gateway system. The gateway logic 116 may be stored on the drive(s) 416, loaded into the system memory 412 and executed by the processor 414.

The gateway logic 116 includes a WAN driver stack 420 for controlling WAN communications, where the WAN driver stack 420 interfaces with the WAN port via the hardware interface 404. The gateway logic 116 also includes a LAN driver stack 422 for interfacing with the LAN port via the hardware interface 404. Gateway software 424 is provided for enabling a communication link between the driver stacks 420 and 422. In particular, information in the form of data or packets from the LAN system may be transferred to the WAN communication link via the gateway software 424 of the gateway logic 116 and vice versa. The gateway software 424 generally interfaces an operating system 426 of the gateway access node 112, which further interfaces one or more LAN and WAN applications 428.

In general, LAN communications over the transmission medium 102 for the gateway access node 112 are handled by the LAN PHY 406, the LAN data pump 407, the LAN driver stack 422, the operating system 426 and the LAN portion of the applications 428.

WAN communications are handled by the WAN PHY 402, the WAN data pump 403, the WAN driver stack 420, the operating system 426 and the WAN portion of the applications 428. Information from the LAN system may be transferred to the WAN system by transmitting data from the LAN driver stack 422 to the WAN driver stack 420 via the gateway software 424. Likewise, WAN communications intended for the LAN system are transferred by transmitting data from the WAN driver stack 420 to the LAN driver stack 422 via the gateway software 424. In this manner, a local LAN system has access to the WAN 138 via the gateway software 424, and thus has access to any desired broadband network such as the Internet.

Figure 5:
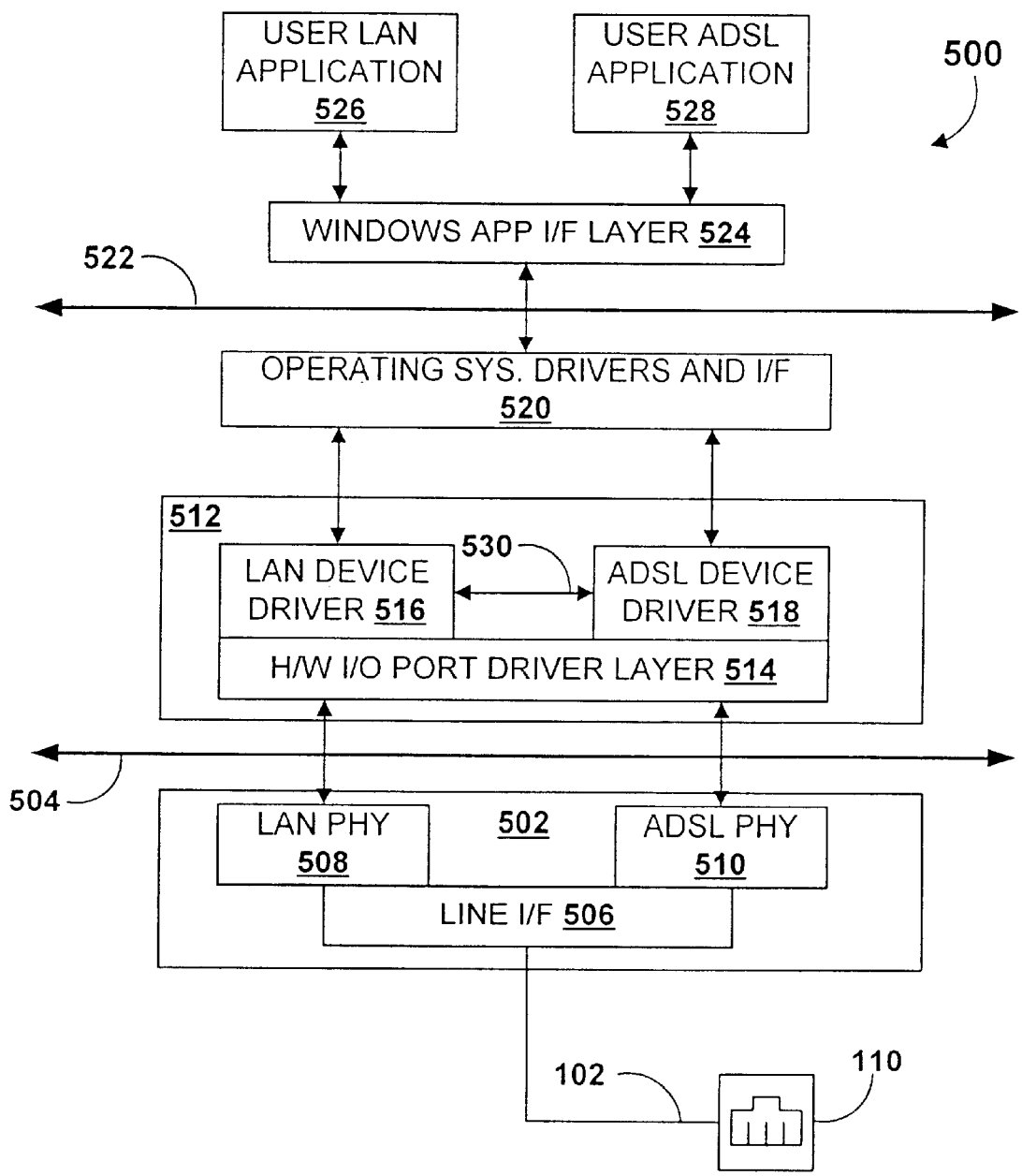
FIG. 5 is a more detailed block diagram of another implementation of the gateway access node of FIG. 1.

Referring now to FIG. 5, a block diagram is shown of a gateway system 500 illustrating another embodiment of the gateway access node 112 using ADSL technology. Again communications are handled via the connector 110 and the transmission medium 102, which interfaces to a hardware portion 502 of the gateway system 500. A solid line 504 generally represents a separation between the hardware and software portions of the gateway system 500. The hardware portion 502 includes a line I/F 506, which includes the circuitry to multiplex transmit and receive data between the hardware portion 502 and the transmission medium 102. The line I/F 506 is coupled to a LAN physical device (PHY) 508 and to an ADSL PHY 510. The line I/F 506 transfers LAN data between the LAN PHY 508 and the transmission medium 102 and transfers WAN data between the ADSL PHY 510 and the transmission medium 102.

The hardware portion 502 interfaces with a set of drivers 512. The drivers 512 include a hardware I/O port driver layer 514 that establishes communication with both the LAN PHY 508 and the ADSL PHY 510. The H/W driver layer 514 further interfaces a LAN device driver 516 and an ADSL device driver 518. The LAN device driver 516 and the ADSL device driver 518 both interface with operating system drivers and interface 520. In the embodiment shown, the operating system drivers and interface 520 communicates with a WINDOWS® application interface layer 524. A solid line 522 denotes separation between the operating system and application layer of the gateway system 500. The WINDOWS® application interface layer 524 further interfaces a user LAN application 526 and a user ADSL application 528.

In this manner, LAN communications are handled via the transmission medium 102 and line I/F 506 through the LAN PHY 508, the H/W driver layer 514, the LAN device driver 516 and the user LAN application 526 via the operating system drivers and interface 520 and the WINDOWS® application interface layer 524. WAN communications are handled via the ADSL PHY 510, the H/W driver layer 514, the ADSL device driver 518 and the user ADSL application 528 via the operating system drivers and interface 520 and the WINDOWS® application interface layer 524.

A communication link 530 is also provided between the LAN device driver 516 and the ADSL device driver 518. In this manner, LAN information intended for transmission to the WAN 138 is transferred via the link 530 from the LAN device driver 516 to the ADSL device driver 518. The ADSL device driver 518 converts and transmits the information to the transmission medium 102 in WAN format via the ADSL PHY 510. Likewise, WAN information intended for the LAN system is converted by the ADSL device driver 518 and transferred to the LAN device driver 516 via the link 530. The LAN device driver 516 transmits the information in LAN format to the transmission medium 102 via the LAN PHY 508. In this manner, a virtual gateway is provided between the drivers 516 and 518. It is noted that gateway security, filtering and firewall functions may be incorporated to prevent unauthorized communications between the LAN and WAN. Such security, filtering and firewall functions are provided within the LAN device driver 516.

Several methods are available for determining whether information from the LAN system is intended for transmission on the WAN communication link and vice versa. In one embodiment using a packet-switched communications, a particular field comprising one or more bits within each LAN packet indicates whether the packet is destined to remain within the LAN system or is to be broadcast via the WAN communication link. A corresponding field in each WAN packet is used to identify packets on the WAN communication link intended for the LAN system. Alternatively, a header or trailer may be appended to each packet that includes a destination identifier indicating whether the packet is intended for a LAN or WAN destination. Alternatively, the gateway access node 116 and the nodes 120 may each be assigned a separate IP address. The WAN 138 transmits packets using TCP/IP with the LAN system IP addresses to the home location 104 via the ISP 136, the router 14 and the central office 106. The gateway access node 116 receives and distributes the packets based on the IP address. Of course, many different techniques are possible and may depend upon the particular LAN protocol chosen by the user.

Figure 6:
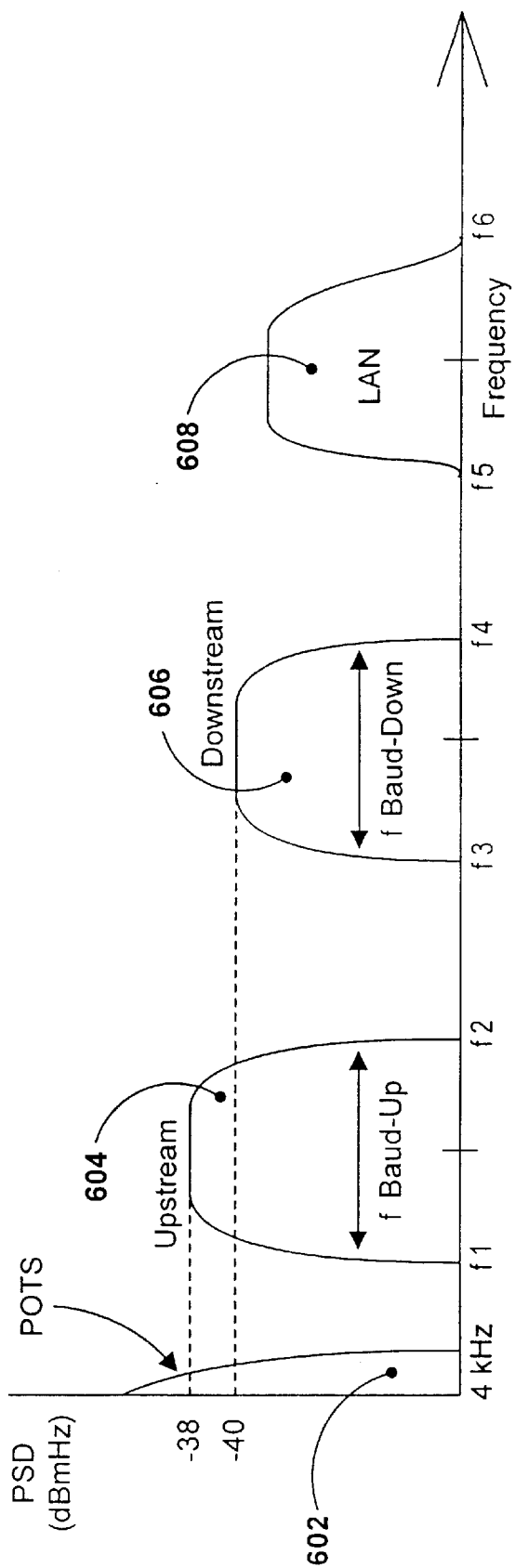
FIG. 6 is a graph illustrating one method of separating operating methods of the LAN, WAN and telephone systems to enable simultaneous communications by separating frequency bands.

Referring now to FIG. 6, a graph is shown illustrating one way of separating operating methods of the LAN, WAN and telephone systems to enable simultaneous communications. In this case, the separation is achieved by using different frequency bands for each system. The power spectral density (PSD) for each communication system is plotted versus frequency in kilohertz (kHz). A frequency band 602 for standard telephones operating according to POTS is located between 0 and 4 kHz. ADSL communications are provided in two separate intermediate frequency bands including an upstream portion 604 for transmitting information from the home location 104 to the central office 106 via the transmission medium 102 and a downstream portion 606 for transmitting data in the opposite direction from the central office 106 to the home location 104. The upstream portion 604 of ADSL is located between a start frequency denoted "f1" and a stop frequency denoted "f2". The downstream portion 606 of ADSL is located between a start frequency denoted "f3" and a stop frequency denoted "f4".

In one embodiment for ADSL, the start frequency f1 for the upstream portion 604 is preferably 30 to 40 kHz and the stop frequency f2 is between 130 and 200 kHz. For the downstream portion 606, the start frequency f3 is greater than 200 kHz such as 240 kHz and the stop frequency f4 is between 390 kHz and 1.5 MHz.

The LAN communications are located in a higher frequency band 608 than the ADSL communications in the embodiment shown. In particular, the LAN communications are provided between a start frequency "f5" and a stop frequency "f6". The frequencies f5 and f6 may be any practical frequency above 1.5 MHz to ensure no interference between the LAN and WAN communications and to provide sufficient bandwidth for the data rates desired. For example, the start frequency f5 may be located at any frequency from 2 MHz or higher with a frequency range suitable for LAN communications.

It is noted that alternative schemes are possible for ensuring independence and non-interference between the LAN and WAN communication protocols. For example, the LAN and WAN frequency bands may overlap or even be located in the same frequency band, where the LAN and WAN interfaces include appropriate circuitry and logic for multiplexing LAN and WAN communications in time. A LAN/WAN multiplexing scheme, however, is more complex and requires a more sophisticated protocol scheme to ensure proper operation and non-interference. The use of different frequency bands to separate the different network communications is a simpler and less complex solution.

Figure 7:
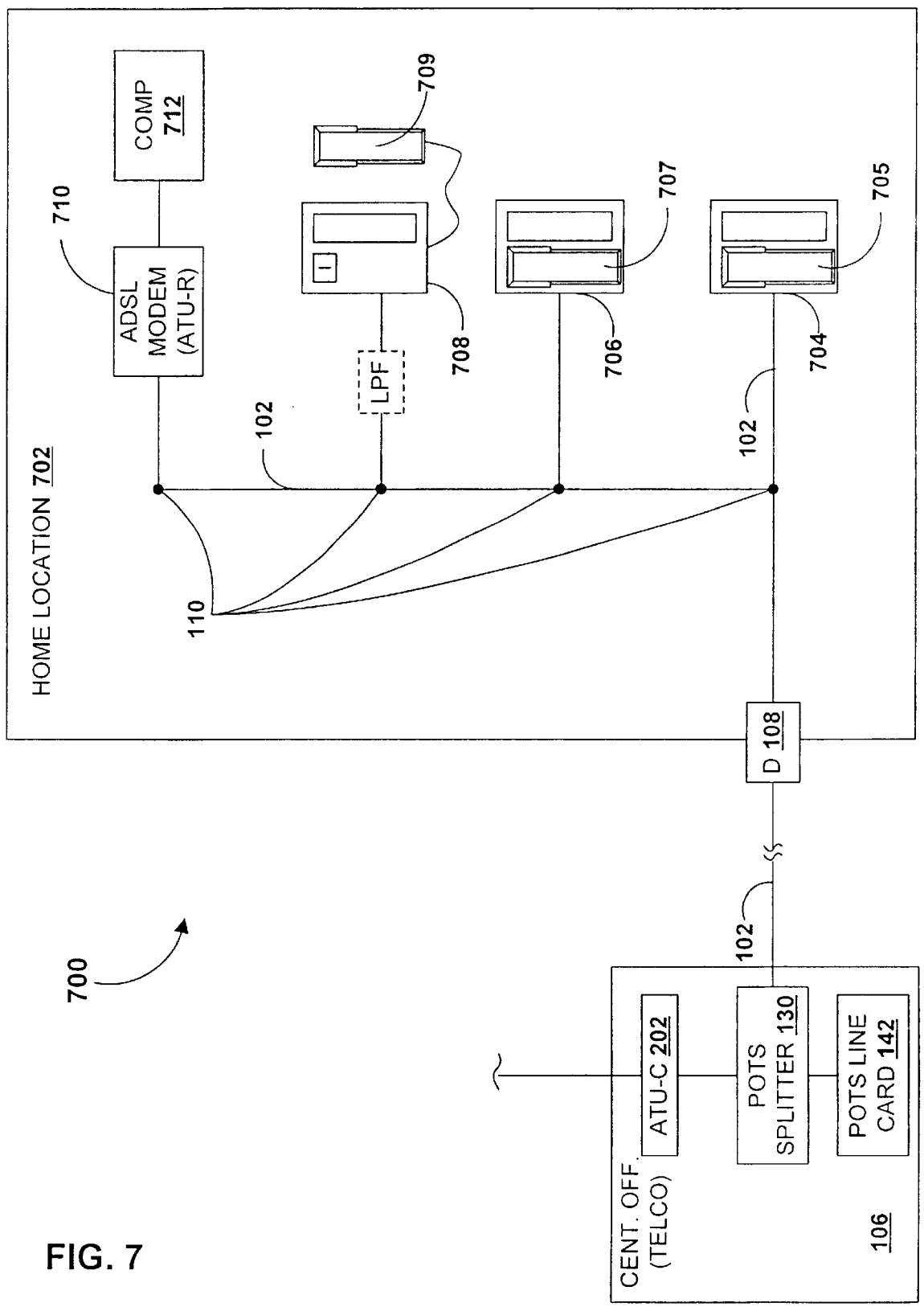
FIG. 7 is a block diagram of a network system including an ADSL digital modem system and method implemented according to the present invention.

Referring now to FIG. 7, an exemplary network system 700 is shown to illustrate a digital modem system and method that supports fast retrain based on communication profiles according to the present invention. The network system 700 is similar to the network system 200 using ADSL technology, except that the home network or LAN configuration at a home location 702 is optional and not shown. The central office 106 includes the POTS splitter 130 coupled to the transmission medium 102, and further includes the ATU-C 202 and the POTS line card 142 coupled to the POTS splitter 130 as previously described. The home location 702 includes several standard telephones 704, 706 and 708, each coupled to the transmission medium 102 via corresponding connectors 110. The phones 704, 706 and 708 each include a corresponding handset 705, 707 and 709, respectively. It is noted that one or more low pass filters (LPF) may be coupled between each phone 704, 706 and 708 and the transmission medium 102 if desired. For example, an optional LPF is shown coupled between the phone 708 and the transmission medium 102, which shields the phone 708 from the ADSL communication frequencies and causes the phone 708 to act like a linear device by cutting off non-linear signals. An ADSL modem 710 (ATU-R) is also coupled to the transmission medium 102 via a connector 110 for enabling a WAN communication link for a computer 712. The ADSL modem 710 may be configured in any desired manner, such as an external modem or an internal modem that plugs into an expansion bus of the computer 712.

The ADSL modem 710 operates according to any DSL configuration using any type of modulation method. Although a full rate ADSL system may be used, the present invention is illustrated using Universal ADSL (U-ADSL) based on modifications to the current standard document Ti.413 Issue 2. The modulation method illustrated is Discrete MultiTone (DMT) using 32 upstream tones and 128 downstream tones as compared to 256 downstream tones for full rate. In general, the frequency range of the transmission medium 104 is divided into a plurality of sub-channels or sub-frequencies, where each sub-channel is an independent channel with its own stream of signals. In order to enable communication, it is desired to determine the signal-to-noise (SNR) ratio for each sub-channel to determine the overall data rate of the channel. The overall data rate is the number of sub-channels times the number of bits per sub-channel times the modulation rate, where the modulation rate is 4KHz for each sub-channel. The number of bits per sub-channel depends upon the SNR for that sub-channel.

The ADSL modem 710 operates according to Forward Error Correction (FEC), which is based on the Reed Solomon coding method. After power up and optional self-test, the ADSL modem 710 participates in an activation and acknowledgment phase and transmits activate or tone requests to the ATU-C 202. The ATU-C 202 responds with an activation signal or activation tones. The ADSL modem 710 and the ATU-C 202 then determine the relevant attributes of the transmission medium 102 using transceiver training and analysis procedures. The ADSL modem 710 measures the communication characteristics of the transmission medium 102, such as the characteristic impedance, the SNR for each sub-channel, the line quality, etc. and generates an initial profile of the channel or transmission medium 102. The initial profile includes bits and gains (B&G) tables, FEC parameters R (redundant check bytes) and S (number of symbols per R-S codeword) values, the interleaver depth (D), and the power spectral density (PSD) level.

Figure 8:
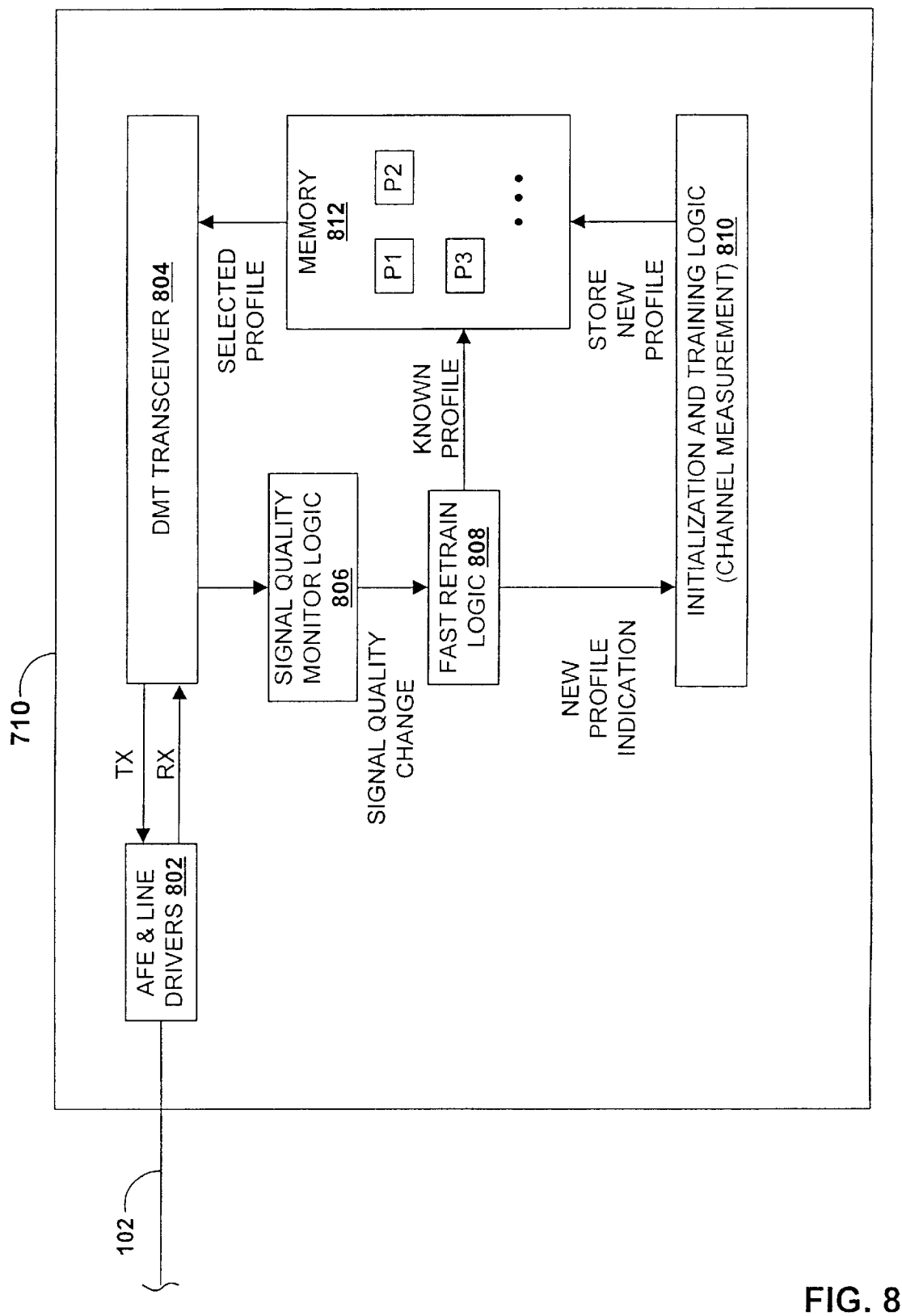
FIG. 8 is a simplified block diagram of the ADSL modem of FIG. 7.

FIG. 8 is a simplified block diagram of the ADSL modem 710. The telephone line r transmission medium 102 is coupled to Analog Front End (AFE) and Line Drivers circuitry 802 that converts digital transmit (TX) signals to analog for transmission and samples analog signals received and converts the analog signals to digital receive (RX) signals. The AFE & Line Drivers circuitry 802 also performs digital filtering. The RX signals are provide to, and the TX signals are generated by, a DMT transceiver 804. The DMT transceiver 804 includes decoding, descrambling, filtering, timing, synchronization and phase lock loop (PLL) circuitry as well as equalizers, digital signal processing (DSP) loops, echo cancelers, etc. The AFE & Line Drivers 802 and the DMT Transceiver 804 collectively comprise communication logic for the ADSL modem 710 for receiving and transmitting data on the transmission medium 102. Signal quality monitor logic 806 monitors DMT signals received by the DMT transceiver 804, determines if the signal quality changes by at least a predetermined amount and provides a signal quality change indication. The signal quality may depreciate or improve depending upon whether a disturbance is added or removed, respectively.

Measurement or initialization and training logic 810 cooperates with the DMT transceiver 804 to perform the initial communication characteristic measurement of the channel on the transmission medium 102 and to generate the initial or best-case communication profile. The training logic 810 then stores the initial profile into a memory 812. Subsequent operation of the training logic 810 depends upon the configuration and embodiment. In one embodiment, the training logic 810 is configured to calculate and store at least one more communication profile into the memory 812. For a two profile configuration, the training logic 810 calculates a worst-case profile based on the initial bestcase profile by using a predetermined cutback value or decibel (dBm) drop. In particular, once the initial profile is measured and exchanged, the training logic calculates and stores in the memory 812 the worst-case profile using the predetermined cutback for each subchannel of the frequency band. Alternatively, the training logic 810 calculates a plurality of communication profiles as described below for storage in the memory 812.

In measurement embodiments, the training logic 810 cooperates with the DMT transceiver 804 to measure at least one more communication profile, and then stores each profile into the memory 812. If the signal quality monitor logic 806 determines that the signal quality has changed or that the SNR has dropped by a significant degree or a predetermined amount, and if the memory 812 does not include a stored profile that enables communication, then the training logic 810 is employed to initiate measurement of the transmission medium 102 and generation of a corresponding communication profile.

In general, the equalizers in the DMT transceiver 804 and the signal quality monitor logic 806 continuously monitor the SNR for each sub-channel during operation by taking the difference between the actual or received symbol received on a sub-channel and the theoretically ideal symbol. If a disturbance on the transmission medium 102 causes a significant drop of signal quality or SNR for any one or more sub-channels so that the current profile is no longer valid, the signal quality monitor logic 806 provides a signal quality change indication to fast retrain logic 808. A memory 812 stores one or more communication profiles P1, P2, P3, etc. for selection by the fast retrain logic 808. The profiles stored in the memory 812 preferably includes at least the initial profile and at least one calculated or measured "worst-case" profile as further described below. If the fast retrain logic 808 determines that at least one existing profile within the memory 812 is sufficient to maintain communications, then the fast retrain logic 808 selects a known profile and reprograms or retrains the DMT transceiver 804 according to the new profile. Such training involves re-adapting the equalizers and DSP loops to the new (and usually reduced) data rate. Operation is able to continue without significant interruption, although at a reduced data rate depending upon the selected profile. It has been determined that fast retrain may occur on the order of several milliseconds (ms) to one or two seconds, which is significantly less than a full retrain procedure potentially lasting several seconds.

If, however, the fast retrain logic 808 determines that none of the existing profiles within the memory 812 is sufficient to maintain communications, then the fast retrain logic 808 provides a new profile indication to the training logic 810, which initiates another measurement of the channel on the transmission medium 102 to perform another full retrain procedure. A new communication profile is generated and stored in the memory 812. The new communication profile is then selected and the DMT transceiver 804 is retrained accordingly.

The initial profile is preferably measured during the best communication conditions of the transmission medium 102 at the home location 702, so that the initial profile is preferably the "best-case" profile. For example, to achieve the best-case profile, it is desired that no other communications are occurring during initialization, and that the handsets 705, 707 and 709 of the respective phones 704, 706 and 708 are on-hook. For purposes of illustration, the handsets 705 and 707 are shown on-hook, while the handset 709 is shown off-hook. Each phone has a different impedance between on-hook and off-hook that affects the frequency band of the transmission medium 102 and generally changes the SNR for one or more of the sub-channels used for communication between the ADSL modem 710 and the ATU-C 202. An off-hook phone generally reduces the signal quality and the SNR of one or more sub-channels.

A reduction of SNR for any one or more sub-channels results in a corresponding reduction in the performance of, and data rate achievable across, the transmission medium 102. The signal processing routines of either or both of the modems ATU-C 202 and the ADSL modem 710 train up to the channel (carried on the transmission medium 102) and determine the best data rate based on the given channel noise. The data rate is determined by measuring the maximum bit rate and gain for each sub-channel under the current noise conditions of the channel, resulting in a B&G table which comprises the primary portion of the corresponding communication profile. After the initial profile is determined, the ADSL modem 710 transmits the initial profile to the ATU-C 202 during an exchange phase. The ATU-C 202 and the ADSL modem 710 each program their respective transceivers according to the initial profile. In this manner, the transceivers of the respective ATU-C 202 and the ADSL modem 710 are matched to produce and appropriately respond to a specific set of precisely-timed signals on the transmission medium 102.

After full initialization, the signal quality monitor logic 806 of the ADSL modem 710 continuously monitors the signal quality and SNR of each tone during communication with the ATU-C 202 across the transmission medium 102. Disturbances occur on the transmission medium 102 due to ringing of the phones 704, 706 and 708, in-premises noise pick-up and on/off hook transitions of the phones. Some disturbances, such as various kinds of in-premises noise pick-up cause only a relatively insignificant reduction of SNR so that communication may be continued using the same communication profile. However, other disturbances, such as POTS signaling and handset on/off hook transitions, significantly degrade signal and line quality. Such disturbances may effectively terminate ADSL communications on the transmission medium 102, so that a new profile must be used.

In a fast retrain method according to the pre-calculated embodiment, a worst-case profile is calculated using the initial profile and a predetermined cutback value or dBm drop. In particular, once the initial profile is measured and exchanged, the ADSL modem 710 and the ATU-C 202 each independently calculate and store the worst-case profile using the predetermined cutback for each sub-channel of the frequency band. In this manner, a new B&G table is calculated within each modem. It is noted that the R and S values, the interleaver depth D, and the PSD level need not be re-calculated and the initial measured values may be used for all other profiles. Thus, these values need not be exchanged again between the ADSL modem 710 and the ATU-C 202. In FIG. 8, for example, the profile P1 may be the initial or best-case profile whereas P2 is the worst-case profile. During operation, the ADSL modem 710 detects a disturbance, determines that the initial profile may no longer be used, switches to the worst-case communication profile and sends a switch or fast retrain indication to the ATU-C 202 to retrain to the worst-case profile. Although communication is temporarily halted, since a new profile need not be calculated, measured or exchanged, the ATU-C 202 and the ADSL modem 710 are each able to program their transceivers relatively quickly and resume communications.

Such fast retrain procedure occurs relatively quickly and may not even be noticed by the user.

The fast retrain indication transmitted across the transmission medium 102 may be performed in any one of several manners. For example, at least one tone may be used and transmitted by the ADSL modem 710 to the ATU-C 202 to provide the fast retrain indication. The ATU-C 202 responds with the same or a different acknowledge tone. Such a tone-based profile exchange mechanism is particularly reliable and robust to ensure proper transition to the new profile. A constant frequency transmitted in any sub-channel is easily and relatively cheaply detected by both the ADSL modem 710 and the ATU-C 202.

The predetermined cutback amount must be chosen to ensure that communications resume in the worst possible scenario at the home location 702. For example, a disturbance occurs if the handset 705 of the phone 704 is lifted off-hook, which would likely cause the ADSL modem 710 to initiate the fast retrain to the worst-case profile. The signal quality degrades even further if a second handset is lifted off-hook, such as the handset 707 from the phone 706, and degrades further still if a third handset is lifted off-hook, such as the handset 709 from the phone 708, etc. Since each home location 702 is different, and may include any number of standard phones, a given cutback amount does not ensure robust communication in all environments, although a reasonable cutback amount may be sufficient for most cases. It is certain that the predetermined cutback amount causes a significant reduction in performance of ADSL communication via the transmission medium 102. Possible cutback amounts are 9, 10, 13, etc. dBm, although any arbitrary cutback value is contemplated.

In a second pre-calculated embodiment, a plurality of predetermined cutback values are used to calculate a corresponding plurality of communication profiles P1, P2, P3, etc. In this case, the ADSL modem 710 detects a change or disturbance of the communication on the transmission medium 102 and determines which of the plurality of known and precalculated profiles provides the best performance. The ADSL modem 710 uses multiple tones to provide the fast retrain indication according to the following equation 1:

$$\text{Log}_2 n = x \quad (1)$$

where Log is the logarithmic function, base 2, "n" is the number of total profiles and "x" is the corresponding number of tones needed to provide the fast retrain indication. Each combination of tones comprises a binary index to identify any one of a plurality of different communication profiles. For example, for each tone used for a fast retrain indication, assertion of a tone may represent binary one (1) whereas absence of a tone represents binary zero (0), or vice versa. Four (4) tones are needed to identify any one of up to 16 different profiles.

One problem with pre-calculated communication profiles is that few, if any, of the profiles are optimal for the given communication characteristics. The gain across the frequency band of operation is not linear, and the effect of each disturbance is also not linear across the sub-channels. Thus, the selected profile represents the worst case signal quality or SNR drop over all of the sub-channels of the frequency band. A greater level of performance is possible and attainable by actually measuring the communication parameters of the transmission medium 102 in its existing condition. A more efficient set of pre-calculated profiles may be achieved through more sophisticated methods based on experimental results. However, each home location 702 has significant variations so that even experimentally determined pre-calculated profiles would still result in less than optimal communication profiles for most locations.

In measurement embodiments, at least one worst-case communication profile is measured and stored. In this embodiment, when the ADSL modem 710 detects a significant disturbance, such as a handset lifted from a phone, the training logic 810 of the ADSL modem 710 is invoked to perform another full retrain procedure to measure the new communication characteristics of the transmission medium 102 in a similar manner as the initial procedure described above, and generates a worst-case profile. The worst-case profile is then transmitted to the other modem or the ATU-C 202 across the transmission medium 102. The ATU-C 202 stores and switches operation to the worst-case profile. Again, only the B&G tables need to be re-generated and the other parameters from the initial profile remain the same. Since the communication characteristics of the transmission medium 102 are measured during the disturbance, the new communication profile enables a more efficient and optimal operation given the particular disturbance. However, communications are interrupted momentarily, such as for several seconds, while the modem performs the retrain procedure.

The signal quality monitor logic 806 of the ADSL modem 710 continues to monitor communication on the transmission medium 102 while operating with the worst-case profile. If and when the disturbance is removed, such as after a handset is replaced to the on-hook position, the ADSL modem 710 sends a fast retrain indication to the ATU-C 202 to retrain back to the initial or best-case communication profile. Again, the fast retrain indication may be performed in any one of several manners, such as one or more predetermined tones. A single tone is sufficient to indicate switching between two communication profiles, thereby simplifying the fast retrain procedure. In this manner, the ADSL modem 710 continuously monitors communication on the transmission medium and switches or retrains between the best and worst-case communication profiles depending upon the communication characteristics of the transmission medium 102 at any given time.

As noted above, a new or different or compounded disturbance may occur so that neither of the measured communication profiles is valid. For example, the worst-case profile may have been measured when one of the handsets, such as the handset 709, was removed from the phone 708. The handset 707 may also be removed from the phone 706, causing further depreciation of line and signal quality. In fact, the current worst-case communication profile may be invalid so that communication is not possible or at least compromised. In one measurement and retrain embodiment, the training logic 810 is simply employed to perform another retrain procedure to measure and determine a new worst-case communication profile that replaces the existing worst-case profile. The new worst-case profile is sent to the ATU-C 202, which replaces its current worst-case profile and retrains operation according to the new worst-case profile.

If all the disturbances are removed, the ATU-C 202 and the fast retrain logic 808 of the ADSL modem 710 perform a fast retrain to switch back to the best-case profile. If another disturbance occurs, the ADSL modem 710 determines if the current worst-case profile is sufficient to enable communication to be maintained. If so, the ADSL modem 710 sends a fast retrain indication to the ATU-C 202 and both modems perform a fast retrain to switch to the worst-case profile. It is noted that if the current worst-case profile is sufficient, it is used and another worst-case profile is not measured even if the disturbance would allow a greater data rate. In this case, the ATU-C 202 and the memory 812 of the ADSL modem 710 store only two communication profiles, including the initial or best-case profile and a worst-case profile. For example, if first, second and third worst-case profiles are consecutively determined for one, two and three phones being off-hook, respectively, then only one worst-case profile is stored and used, likely associated with three phones being off-hook, even for situations in which only one or two phones are off-hook. This allows a fast retrain to be used for any disturbance and substantial interruptions are avoided.

In another measurement embodiment, the ATU-C 202 and the ADSL modem 710 each store a plurality of measured communication profiles. It is possible to perform a more sophisticated initialization to measure the most likely disturbances and store corresponding profiles. In a manual initialization, the user is requested to remove the handsets one at a time and then two at a time, etc., until all desired profiles are determined. The manual procedure may be simplified by recognizing that any single off-hook handset causes approximately the same level of disturbance, that any combination of two off-hook handsets also causes approximately the same level of disturbance, and so on. However, since such disturbances are typically non-linear and based on many complex factors, a measured profile may not work for all disturbance combinations. In any event, any such manual initialization is somewhat time-consuming and impractical and would likely not be the most popular solution.

In a more automated embodiment, each time a disturbance occurs, the fast retrain logic 808 of the ADSL modem 710 determines which of the plurality of stored communication profiles enables communication with the greatest data rate, if any. If none of the profiles is sufficient, such as, for example, a new disturbance that is greater than any previously measured disturbance, then the training logic 810 performs a new measurement procedure to generate a new profile, which is stored with the other profiles in the memory 812 and sent to the ATU-C 202. In this case, however, once a profile is generated, it is stored and is not replaced by a new worst-case profile. If the initial profile is considered a first profile P1, then a second profile P2 is generated for one phone off-hook, a third profile P3 is generated for two phones off-hook, a fourth profile P4 is generated for three phones off-hook, and so on.

The system and method of measuring and storing a plurality of profiles uses more memory and requires one of the modems, such as the ADSL modem 710, to measure and determine the best profile, if any, to use for each disturbance. Nonetheless, each fast retrain is significantly faster than a full retrain and enables more efficient communication since each disturbance is effectively measured and evaluated to enable the greatest data rate available during the existence of that disturbance. It may be desired to limit the maximum number of possible profiles, such as a total of sixteen (16) profiles. If 16 profiles are measured and stored, and then an even worse disturbance occurs so that none of the current profiles is valid, then the worst of the current 16 is replaced by the new worst-case communication profile. In most home locations 16 profiles is sufficient for most known and likely disturbances. As stated previously, the ADSL modem 710 uses up to 4 tones to rovide a fast retrain indication for up to 16 possible profiles. The ADSL modem 710 simply asserts a corresponding combination of the Up to 4 tones to represent a binary number as an index the appropriate one of the up to 16 different profiles.

It is noted that in any of the fast retrain embodiments described above, the ATU-C 202 may also include the same or similar fast retrain capabilities. In that case, if the ATU-C 202 detects a disturbance, it sends a fast retrain request to the ADSL modem 710, which responds with an acknowledge tone and receives a new profile for storage in the memory 812. The ADSL modem 710 then retrains the DMT transceiver 804 according to the new communication profile to communicate with the ATU-C 202. Of course, the most likely disturbances occur at the home location 702 given the more variable environment.

Figure 9:
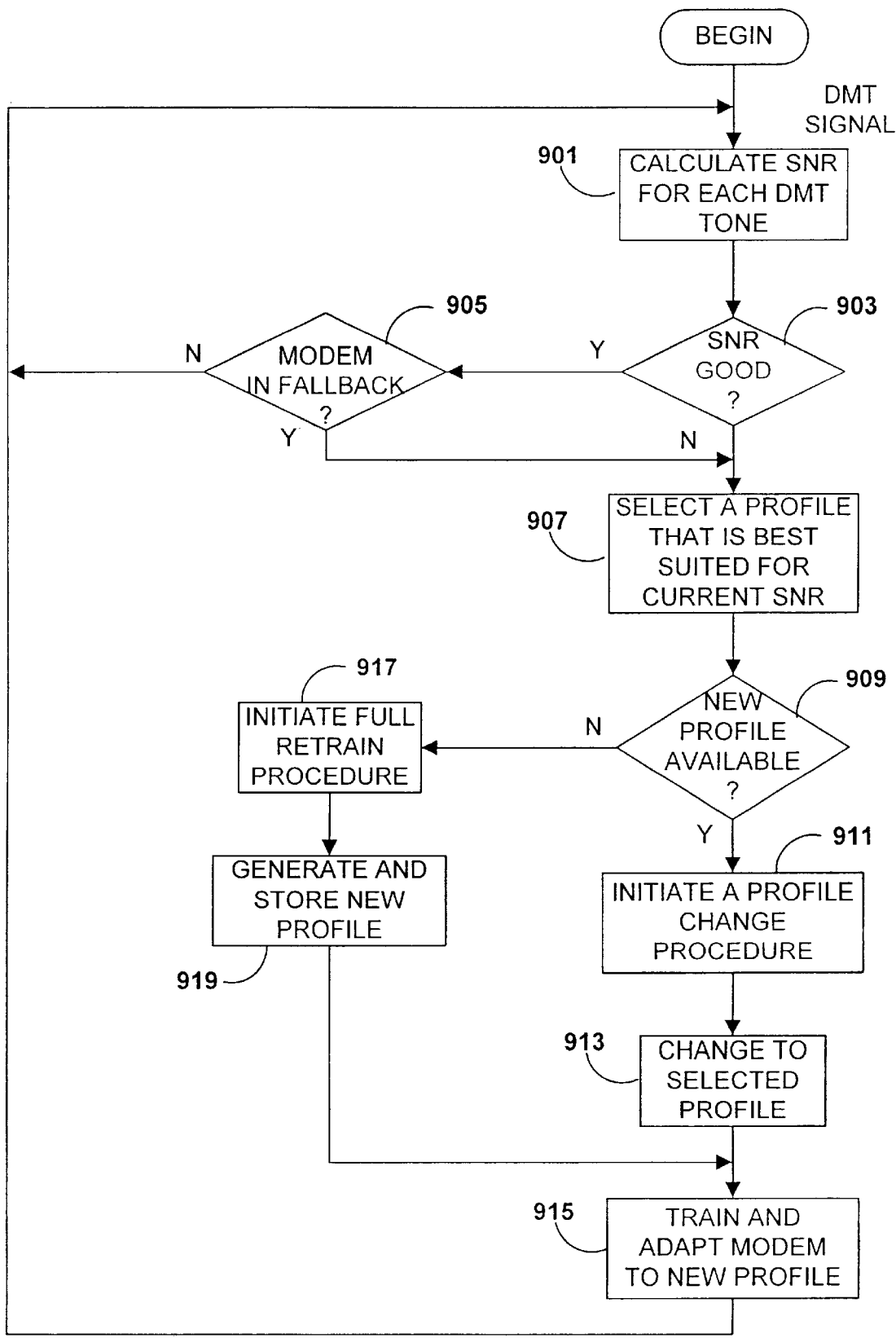
FIG. 9 is flowchart diagram illustrating a fast retrain method according to the present invention.

FIG. 9 is flowchart diagram illustrating a fast retrain method according to the present invention for a plurality of measured profiles. The method shown in FIG. 9 is performed by the ADSL modem 710, the ATU-C 202, or both, although operation is illustrated herein with reference to the ADSL modem 710. In response to detection of at least one DMT signal, operation proceeds to block 901 where the SNR for each DMT tone is calculated by the signal quality monitor logic 806. Operation proceeds to next block 903 where it is queried whether the SNR is acceptable or good to maintain communications. If so, operation proceeds to block 905 to determine if the modem is in fallback mode. Fallback means that the modem is not operating with the best available communication profile and that a greater data rate is possible given the current condition of the transmission medium 102. If the modem is not in fallback, then operation proceeds back to block 901 to repeat the procedure in a continuous manner. In this manner, the signal quality monitor logic 806 continuously monitors the DMT tones received by the DMT transceiver 804.

If the SNR is not acceptable as determined at block 903, or if the modem is operating in fallback as determined at block 905, then operation proceeds to block 907 where the fast retrain logic 808 selects a known profile from the memory 812 that is suitable for the measured signal quality. At this point, the signal quality has either improved and a better profile is available for more efficient operation or the signal quality has depreciated and another profile is needed to maintain communications. Operation proceeds to next block 909 to determine if a communication profile is available in the memory 812 that is suitable for the measured signal quality. If a suitable profile is found in the memory 812, operation proceeds to next block 911 where the fast retrain logic 808 initiates a profile change procedure. The fast retrain indication is sent to a remote modem, such as the ATUC-202, and the retrain procedure is acknowledged. Operation then proceeds to next block 913 where the fast retrain logic 808 changes to the newly selected profile and then to block 915 where the DMT transceiver 804 is retrained according to the newly selected profile. Operation then returns to block 901 for continuous signal quality monitoring.

If a suitable profile is not available in the memory 812 as determined at block 909, then operation proceeds instead to block 917, where the initialization and training logic 810 initiates a full retrain procedure. At this point, the remote modem, such as the ATU-C 202, is capable of detecting that a full retrain procedure is occurring. Operation proceeds to next block 919 where the training logic 810 generates and stores a new profile in the memory 812. Operation then proceeds to block 915, where the DMT transceiver 804 is retrained according to the newly measured and stored profile, and then operation returns to block 901 for continuous signal quality monitoring.

It is now appreciated that a digital modem and modem system that supports fast retrain based on communication profiles according to the present invention enables efficient ADSL communications for a home location without a POTS splitter. Disturbances in the line or signal quality are detected and measured and a new profile is generated and exchanged between the modems. Both modems adapt to the new communication characteristics by retraining according to the new communication profile. At least two profiles, including a best-case profile and a worst-case profile, enable communications to continue with little or no interruption. When operating according to one of two profiles, if one of the modems detects a disturbance or removal of a disturbance, it sends a fast retrain indication and both modems switch to operate according to the other profile. A plurality of profiles may also be generated and used, where one modem determines the proper profile and asserts the fast retrain indication to identify the appropriate profile. In this manner, both modems quickly retrain according to the same profile and resume communications.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A digital modem for coupling to a transmission medium, comprising:
   a memory that stores a plurality of communication profiles;
   communication logic that sends and receives information via the transmission medium and that operates according to any one of the plurality of communication profiles;
   monitor logic that continuously monitors communication by the communication logic on the transmission medium according to any one of the plurality of communication profiles and that provides a signal change indication if the communication characteristics change by at least a predetermined amount; and
   fast retrain logic that selects another one of the plurality of communication profiles stored in the memory in response to the signal change indication, that retrains the communication logic to operate according to the selected communication profile and that cooperates with the communication logic to transmit a fast retrain indication via the transmission medium.

2. The digital modem of claim 1, further comprising:
   measuring logic that cooperates with the communication logic to measure the communication characteristics of the transmission medium and that generates and stores a corresponding communication profile into the memory; and
   each of the plurality of communication profiles being measured and stored by the measuring logic in cooperation with the communication logic.

3. The digital modem of claim 2, further comprising:
   the fast retrain logic receiving the signal change indication and determining that none of the plurality of communication profiles is valid based on the communication characteristics and providing a new profile indication;
   the measuring logic receiving the new profile indication, cooperating with the communication logic to measure the communication characteristics of the transmission medium and generating and storing a corresponding new communication profile into the memory; and
   the measuring logic cooperating with the communication logic to send the new communication profile via the transmission medium.

4. The digital modem of claim 1, wherein the fast retrain indication is tone based.

5. The digital modem of claim 4, further comprising:
   the fast retrain indication comprising a plurality of tones that provides an index to the plurality of communication profiles.

6. A digital modem system, comprising:
   a transmission medium;
   a first modem, coupled to the transmission medium, comprising:
      a first memory that stores a plurality of communication profiles;
      communication logic that sends and receives information via the transmission medium and that operates according to any one of the plurality of communication profiles;
      monitor logic that continuously monitors communication by the communication logic on the transmission medium according to any one of the plurality of communication profiles and that provides a signal change indication if the communication characteristics change by at least a predetermined amount; and
      first fast retrain logic that selects another one of the plurality of communication profiles stored in the memory in response to the signal change indication, that retrains the communication logic to operate according to the selected communication profile and that cooperates with the communication logic to transmit a fast retrain indication via the transmission medium; and
   a second modem, coupled to the transmission medium, comprising:
      a second memory that stores the plurality of profiles;
      second communication logic that receives and operates according to any communication profile sent by the first modem; and
      second fast retrain logic that, upon detecting the fast retrain indication sent by the first modem, retrains the second communication logic to operate according to the selected communication profile.

7. The digital modem system of claim 6, further comprising:
   the first memory and the second memory storing at least a first and a second communication profile;
   the first and second communication logic operating according to the second communication profile;
   the monitor logic detecting the communication characteristics improve by at least the predetermined amount and providing the signal change indication;
   the first fast retrain logic retraining the first communication logic to operate according to the first communication profile and cooperating with the first communication logic to transmit a fast retrain indication via the transmission medium to the second modem; and
   the second modem receiving the fast retrain indication and the second fast retrain logic retraining the second communication logic to operate according to the first communication profile.

8. The digital modem system of claim 7, further comprising:
   the monitor logic detecting the communication characteristics depreciate by at least the predetermined amount and providing the signal change indication;

the first fast retrain logic retraining the first communication logic to operate according to the second communication profile and cooperating with the communication logic to transmit a fast retrain indication via the transmission medium; and the second modem receiving the fast retrain indication and the second fast retrain logic retraining the second communication logic to operate according to the second communication profile.

9. The digital modem of claim 7, further comprising:

the monitor logic detecting the communication characteristics depreciate by at least the predetermined amount and providing the signal change indication;

the first fast retrain logic determining that that first and second communication profiles are not suitable and providing a new profile indication;

measurement logic, in response to the new profile indication, that cooperates with the first communication logic to measure the communication characteristics of the transmission medium and that generates and stores a corresponding third communication profile into the memory;

the measurement logic training the first communication logic to operate according to the third communication profile and cooperating with the first communication logic to transmit the third communication profile via the transmission medium; and the second modem receiving and storing the third communication profile into the second memory and retraining the second communication logic to operate according to the third communication profile.

10. The digital modem of claim 9, wherein the third communication profile replaces the second communication profile and wherein the fast retrain indication comprises a single tone.

11. The digital modem of claim 9, wherein the first memory stores the first, second and third communication profiles and wherein the fast retrain indication comprises a plurality of tones to provide a binary index to the plurality of communication profiles.

12. The digital modem of claim 6, further comprising:

the first modem including measuring logic that cooperates with the first communication logic to measure the communication characteristics of the transmission medium upon initialization and that generates and stores a corresponding first communication profile into the first memory;

the measurement logic cooperating with the first communication logic to send the first communication profile to the second modem via the transmission medium;

the measurement logic calculating at least one more communication profile based on the first communication profile and a predetermined cutback amount and storing the at least one more communication profile in the first memory;

the second modem receiving and storing the first communication profile; and the second modem independently calculating the at least one more communication profile based on the first communication profile and the predetermined cutback amount and storing the at least one more communication profile in the second memory.

* * * * *